(12) United States Patent
Pelletier et al.

(10) Patent No.: US 10,697,888 B2
(45) Date of Patent: Jun. 30, 2020

(54) REAL-TIME PROGRAMMABLE ICE AND APPLICATIONS IN OPTICAL MEASUREMENTS

(71) Applicant: Halliburton Energy Services, Inc., Houston, TX (US)

(72) Inventors: Michael T. Pelletier, Houston, TX (US); David L. Perkins, The Woodlands, TX (US); Li Gao, Katy, TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 45 days.

(21) Appl. No.: 16/013,030

(22) Filed: Jun. 20, 2018

(65) Prior Publication Data

US 2018/0299372 A1   Oct. 18, 2018

Related U.S. Application Data

(62) Division of application No. 14/911,365, filed as application No. PCT/US2013/063436 on Oct. 14, 2013, now abandoned.

(51) Int. Cl.
| | |
|---|---|
| *G01N 21/31* | (2006.01) |
| *G01V 8/00* | (2006.01) |
| *G01N 21/25* | (2006.01) |
| *G01J 3/433* | (2006.01) |

(52) U.S. Cl.
CPC ............. *G01N 21/31* (2013.01); *G01J 3/433* (2013.01); *G01N 21/255* (2013.01); *G01V 8/00* (2013.01); *G01N 2021/317* (2013.01); *G01N 2021/3137* (2013.01)

(58) Field of Classification Search
CPC ............ G01J 3/433; G01N 2021/3137; G01N 2021/317; G01N 21/255
See application file for complete search history.

(56) References Cited

U.S. PATENT DOCUMENTS

| | | |
|---|---|---|
| 4,242,194 A | 12/1980 | Steiner et al. |
| 5,129,058 A | 7/1992 | Mifune et al. |
| 6,331,910 B1 | 12/2001 | Dultz et al. |

(Continued)

OTHER PUBLICATIONS

Office Action issued for Mexican Pat. Application No. MX/a/2016/002741, dated Aug. 22, 2018, pages.

(Continued)

*Primary Examiner* — Violeta A Prieto
(74) *Attorney, Agent, or Firm* — Haynes and Boone, LLP

(57) ABSTRACT

A system and method are disclosed for configuring an integrated computational element (ICE) to measure a property of a sample of interest. The system includes an illumination source to provide a sample light which is reflected from or transmitted through a sample. A dispersive element disperses the sample light into wavelength portions. An intensity modulation device having an array of electronically controllable modulation elements is disclosed that forms a pattern which modulates the dispersed sample light. Collection optics focuses the modulated sample light on a detector, which generates a signal that correlates to a property of the sample. The electronically controllable modulation elements can be readily altered to conform to a different measurable property of a sample of interest as desired.

21 Claims, 10 Drawing Sheets

(56) References Cited

U.S. PATENT DOCUMENTS

| | | |
|---|---|---|
| 7,342,658 B2 | 3/2008 | Kowarz et al. |
| 7,460,236 B2 | 12/2008 | Ivarsson |
| 7,562,057 B2 | 7/2009 | Maggioni et al. |
| 7,944,557 B2 | 5/2011 | Hagler |
| 2002/0018213 A1 | 2/2002 | Ibukuro et al. |
| 2002/0057431 A1 | 5/2002 | Fateley et al. |
| 2004/0069942 A1 | 4/2004 | Fujisawa et al. |
| 2004/0145744 A1 | 7/2004 | Dobschal et al. |
| 2004/0218172 A1 | 11/2004 | DeVerse et al. |
| 2005/0024640 A1* | 2/2005 | Fateley ............... G01J 3/02 356/330 |
| 2005/0243312 A1* | 11/2005 | Geshwind ............... G01J 3/02 356/310 |
| 2006/0092414 A1* | 5/2006 | Geshwind ............... G01J 3/02 356/310 |
| 2007/0263214 A1* | 11/2007 | Fateley ............... G01J 3/02 356/332 |
| 2009/0154876 A1 | 6/2009 | Mclaughlin et al. |
| 2012/0021525 A1 | 1/2012 | Fehr et al. |
| 2012/0211650 A1 | 8/2012 | Jones et al. |
| 2013/0284894 A1* | 10/2013 | Freese ............... G06E 3/001 250/208.2 |
| 2013/0284895 A1* | 10/2013 | Freese ............... G02B 27/1006 250/208.2 |
| 2013/0284896 A1* | 10/2013 | Freese ............... G01J 3/36 250/208.2 |
| 2013/0284897 A1* | 10/2013 | Freese ............... G01N 21/31 250/208.2 |
| 2013/0284898 A1* | 10/2013 | Freese ............... G01N 21/31 250/208.2 |
| 2013/0284900 A1* | 10/2013 | Freese ............... G01N 21/17 250/208.2 |
| 2013/0284901 A1* | 10/2013 | Freese ............... G01N 21/31 250/208.2 |
| 2013/0287061 A1* | 10/2013 | Freese ............... G01K 13/00 374/142 |
| 2015/0015884 A1* | 1/2015 | Russell ............... G01N 21/31 356/402 |
| 2015/0346084 A1* | 12/2015 | Russell ............... G01N 33/442 356/402 |
| 2016/0131623 A1* | 5/2016 | Morgan ............... G01N 21/85 250/338.5 |
| 2016/0273911 A1* | 9/2016 | Jamison ............... G01L 1/241 |
| 2017/0010221 A1* | 1/2017 | Heaton ............... G01N 21/85 |
| 2018/0202922 A1* | 7/2018 | Price ............... G01J 3/02 |

OTHER PUBLICATIONS

International Search Report and the Written Opinion of the International Searching Authority, or the Declaration, dated Feb. 28, 2014, PCT/US2013/063436, 11 pages, ISA/US.

* cited by examiner

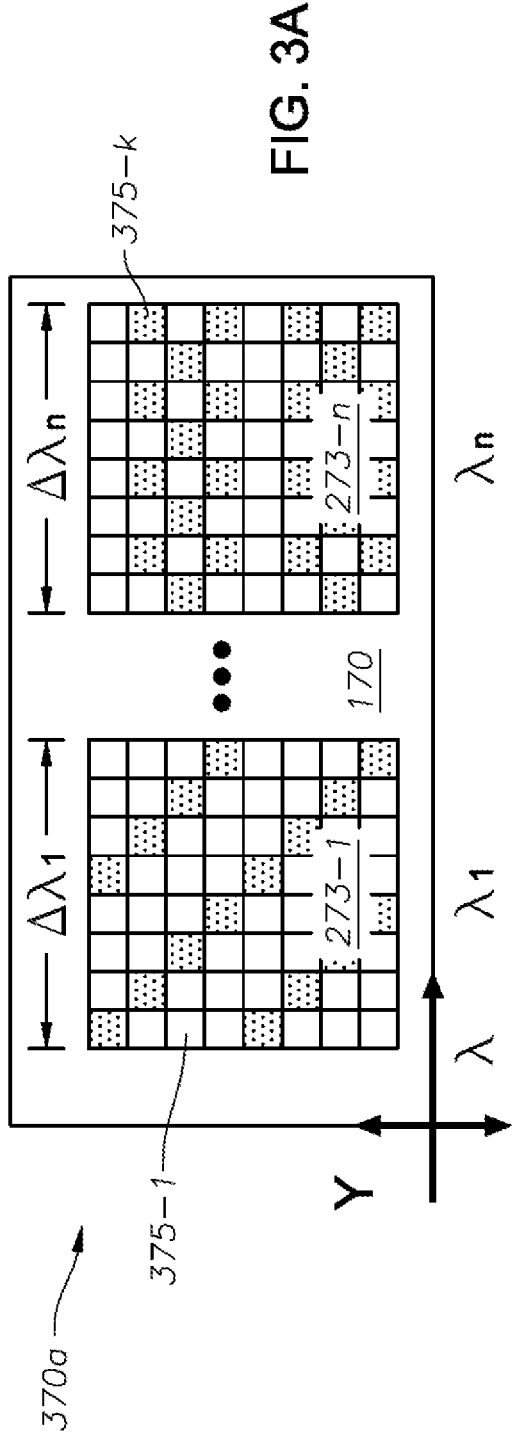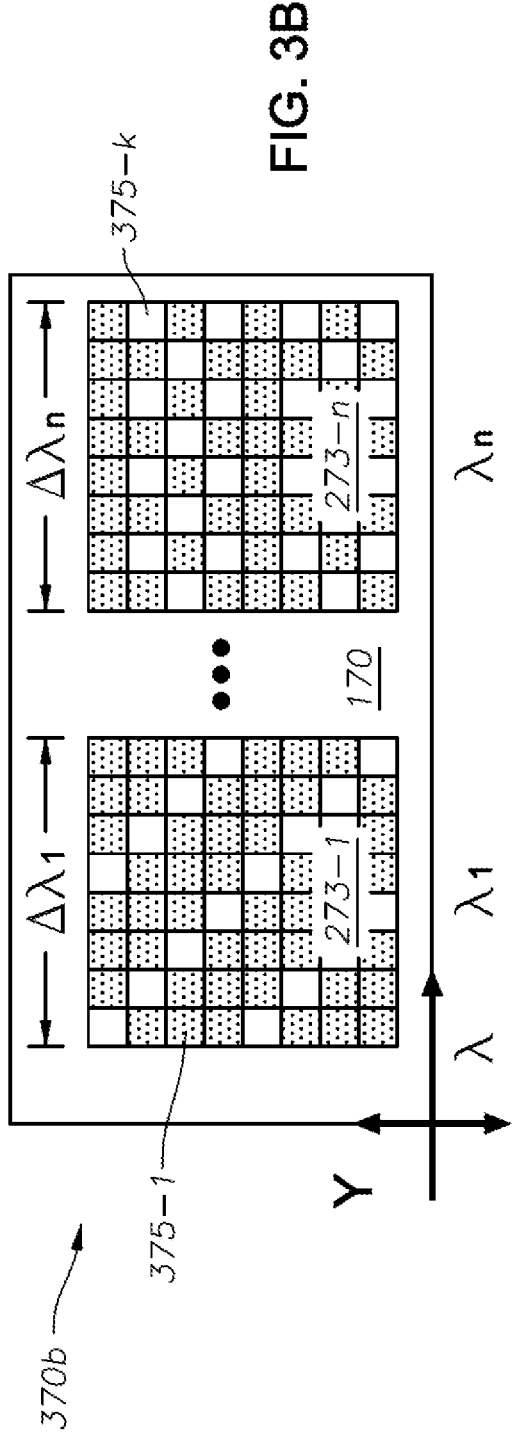

REAL-TIME PROGRAMMABLE ICE AND APPLICATIONS IN OPTICAL MEASUREMENTS

The present application is a Divisional Patent Application of U.S. patent application Ser. No. 14/911,365, filed on Feb. 10, 2016, which is a U.S. National Stage patent application of International Patent Application No. PCT/US2013/063436, filed on Oct. 4, 2013, the benefit of which is claimed and the disclosures of which are incorporated herein by reference in their entirety.

BACKGROUND

Technical Field

Embodiments disclosed herein relate to the field of optical measurements of fluid samples. In particular, embodiments disclosed herein relate to the field of optical measurements of fluid samples using integrated computational elements to determine measureable fluid properties.

Description of Related Art

In the field of oil exploration and extraction there is often the need to perform measurements of samples to determine their chemical composition and other measureable fluid properties. In many cases, methods and systems to perform optical measurements use a spectrally resolved optical device to analyze a sample light. Such spectrally resolved optical devices are typically designed for measuring a single specific fluid property. Filters and other spectrally resolved optical devices are typically complicated to manufacture and involve time-consuming procedures. Moreover, state-of-the-art spectrally resolved optical devices and components are often difficult to correct when a re-calibration procedure so requires.

In the field of hydrocarbon exploration and extraction, known optical measurement techniques are often difficult to apply due to the wide spectral range involved in the measurement, covering from the ultra-violet (UV, 250 nm-450 nm), the visible (VIS, 450 nm-750 nm) and near infrared (NIR, 750 nm-2500 nm) to the mid-infrared spectral region and beyond (2500 nm-10 µm). Some prior art approaches attempt to overcome the broad band problem by having a plurality of manufactured filters and spectrally resolved optical devices mounted onto a rotating wheel. This approach has the drawback of increasing device overhead in a limited space environment, such as in a downhole oil exploration and extraction application. Furthermore, with filter rotation and fluid flow in an optical cell (e.g., for fluid samples), the measurement system becomes difficult to align and may be prone to errors. Prior art devices such as this are mechanically and electronically complex systems due to the need for wheel synchronization and mechanical robustness in the rotating filter mechanism. Prior art devices have another drawback in that sample light may pass through the filters at different times. This adds additional complexity to data analysis, compromising results accuracy with undesirable latency in the slow rotation of typical filter wheels, and rotation jitter.

Another drawback of conventional filters and other spectrally resolved optical devices is manufacturability. Indeed, the most desirable spectral profile may be costly to fabricate within a desirable error tolerance. Typically, a desired model is provided to a manufacturer for thin film deposition. After filters and spectrally resolved optical devices are manufactured, a calibration process is typically needed to characterize the response of the optical measurement system for samples at different temperatures and pressures. Thus, manufacturing steps in certain state-of-the-art optical measurement systems may increase error and cost of the system.

What is needed is a method and a system to allow spectral measurements of samples using a broad spectral band with a reduced number of physical components. Also needed are a system and a method for using the system that is rugged and compact, providing detailed information of a sample composition.

BRIEF DESCRIPTION OF THE DRAWINGS

FIG. 3A shows components of an intensity modulation block in a system to perform an optical measurement of a sample, according to some embodiments.

FIG. 3B shows components of an intensity modulation block in a system to perform an optical measurement of a sample, according to some embodiments.

Wherever possible, the same reference numbers are used throughout the drawings to refer to the same or like elements.

DETAILED DESCRIPTION

Embodiments disclosed herein provide a rugged and compact optical measurement system including at least one integrated computational element (ICE) electrically configured to measure a property of a sample of interest. To provide detailed compositional information of a sample, some embodiments may include a plurality of electrically configured ICEs covering an entire optical spectrum of interest, including the UV, VIS, NIR, and MIR spectral regions. Additionally, in some embodiments, a single or limited number of ICEs may be electrically configurable to function as a plurality of ICEs used in an optical measurement. Thus, embodiments as disclosed herein significantly reduce the complexity of the system, simplifying alignment of different optical components, boosting reliability of the sensor's mechanical, electrical and electronic components, and reducing the number of moving parts.

Figure 1:
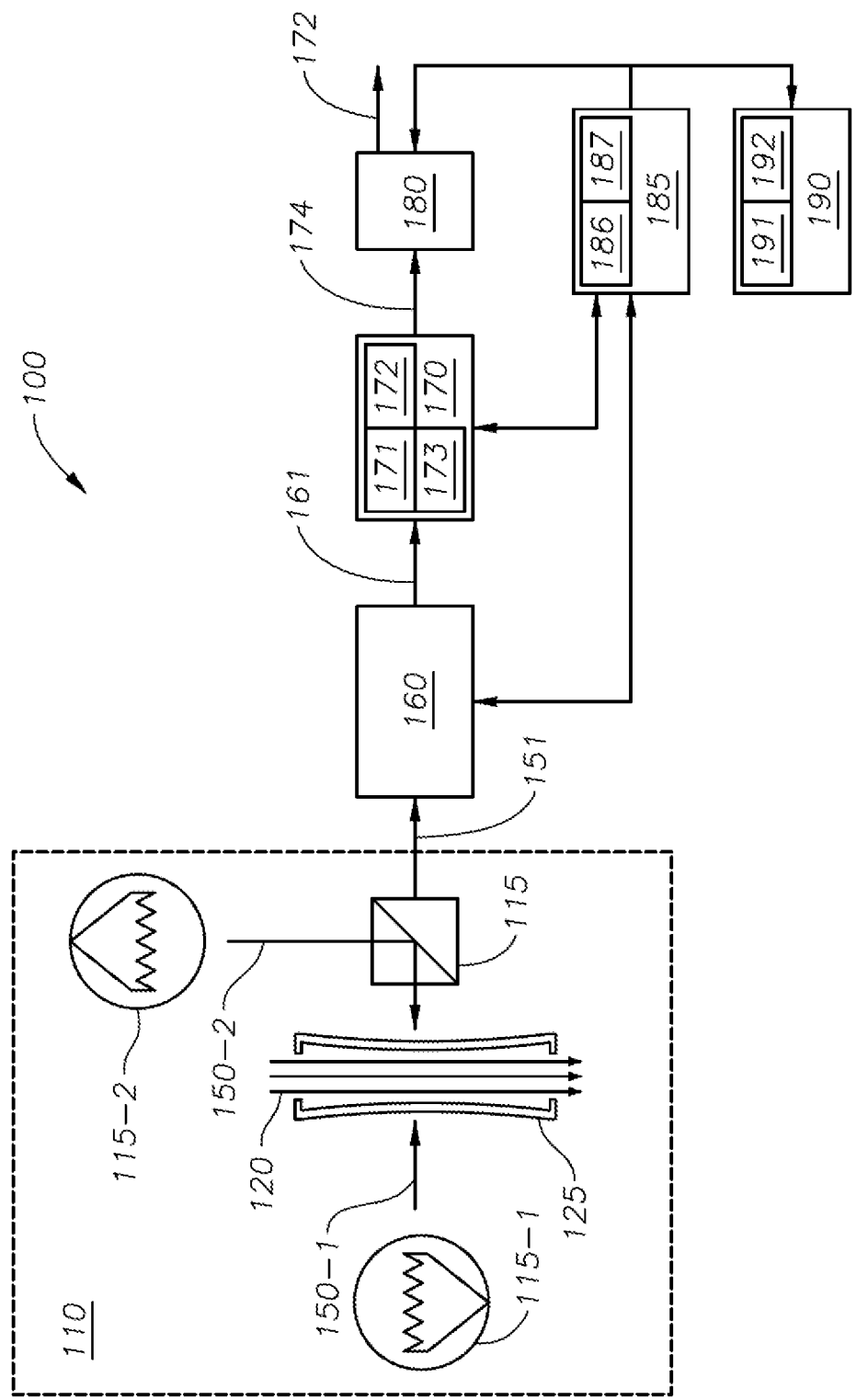
FIG. 1 shows a system to perform an optical measurement of a sample, according to some embodiments.

FIG. 1 shows a system 100 to perform an optical measurement of a sample, according to some embodiments. System 100 includes a sample illumination block 110, a spectral dispersion block 160, an intensity modulation block 170, a detector block 180, a controller block 185, and an analysis unit 190. Sample illumination block 110 may include one or more light sources 115 providing an illumination light 150 to a sample 120. The particular arrangement of light source 115 depends on the sample 120 being analyzed. If the sample is transparent, light source 115-1 may be arranged to pass illumination light 150-1 through sample 120. Alternatively, if the sample is opaque, light source 115-2 may be arranged so that an illumination light 150-2 is reflected or back-scattered from sample 120. In such an arrangement, a beamsplitter 115 may be provided to direct illumination light 150-2 to sample 120. Generally, sample 120 is contained in a sample containment area 125. Sample containment area 125 may be a cavity, an open or closed container or simply a window adjacent a sample to be analyzed, such as for example, a window within a conduit or tubular member in which a sample is contained. In certain embodiments, multiple light sources 115-1 and 115-2 may be utilized. In such a case, beamsplitter 115 also collects a portion of light 150-1 that has traversed sample 120, and a portion of light 150-2 that is backscattered from sample 120. In any event, a sample light 151, either from illumination light 150-1 or illumination light 150-2, or a combination thereof, exits illumination block 110 for further processing.

Spectral dispersion block 160 separates sample light 151 into wavelength $\lambda$, each wavelength $\lambda$ having a bandwidth $\Delta\lambda$. Unless otherwise stated, references to a wavelength $\lambda$ herein shall be understood to refer to the center wavelength. Dispersion block 160 may include a dispersive element, such as a prism or a diffraction grating. The dispersed wavelengths $\lambda_1$-$\lambda_n$ form dispersed sample light 161, which is transmitted to intensity modulation block 170. As such, sample light 161 is transmitted across a plurality of spectral ranges. In some embodiments dispersion block 160 may provide light 161 further separated into a UV portion, VIS portion, a NIR portion, and a MIR portion. In some embodiments, dispersed sample light 161 may include wavelength portions within a specific band of interest, such as the UV, the VIS, the NIR, or the MIR bands.

Intensity modulation block 170 generally includes an intensity modulation device 173 for each wavelength $\lambda$ of interest in sample light 161. The device 173 may be electrically tuned to absorb, reflect or transmit all or a portion of the wavelength $\lambda$ assigned to device 173. In some embodiments, device 173 includes a digital light processor (DLP) chip or other MicroElectroMechanical (MEM) system. Block 170 may include a plurality of devices 173. In certain embodiments, such devices 173 may be arranged in an array. Intensity modulation block 170 may also include a processor circuit 171 and a memory circuit 172. Processor circuit 171 may perform operations or otherwise control the operation of devices 173 upon executing commands stored in memory circuit 172. Memory circuit 172 may also store a plurality of frames or two-dimensional (2D) patterns associated with a measurable property of sample 120. Processor circuit 171 can accordingly adjust devices 173 to a particular pattern stored in memory circuit 172.

Detector block 180 receives modulated, dispersed sample light 174 and provides a signal to controller block 185 and analysis unit 190. Detector block 180 also generates an output signal 177 based on sample light 174 which signal 177 correlates to a property of sample 120. Controller block 185 may include a processor circuit 186 and a memory circuit 187. The processor circuit may include synchronization electronics to adjust the timing of intensity modulation block 170 and the integration of a signal provided by detector block 180. Analysis unit 190 may also include a processor circuit 191 and a memory circuit 192 to process data provided by controller block 185.

Figure 2:
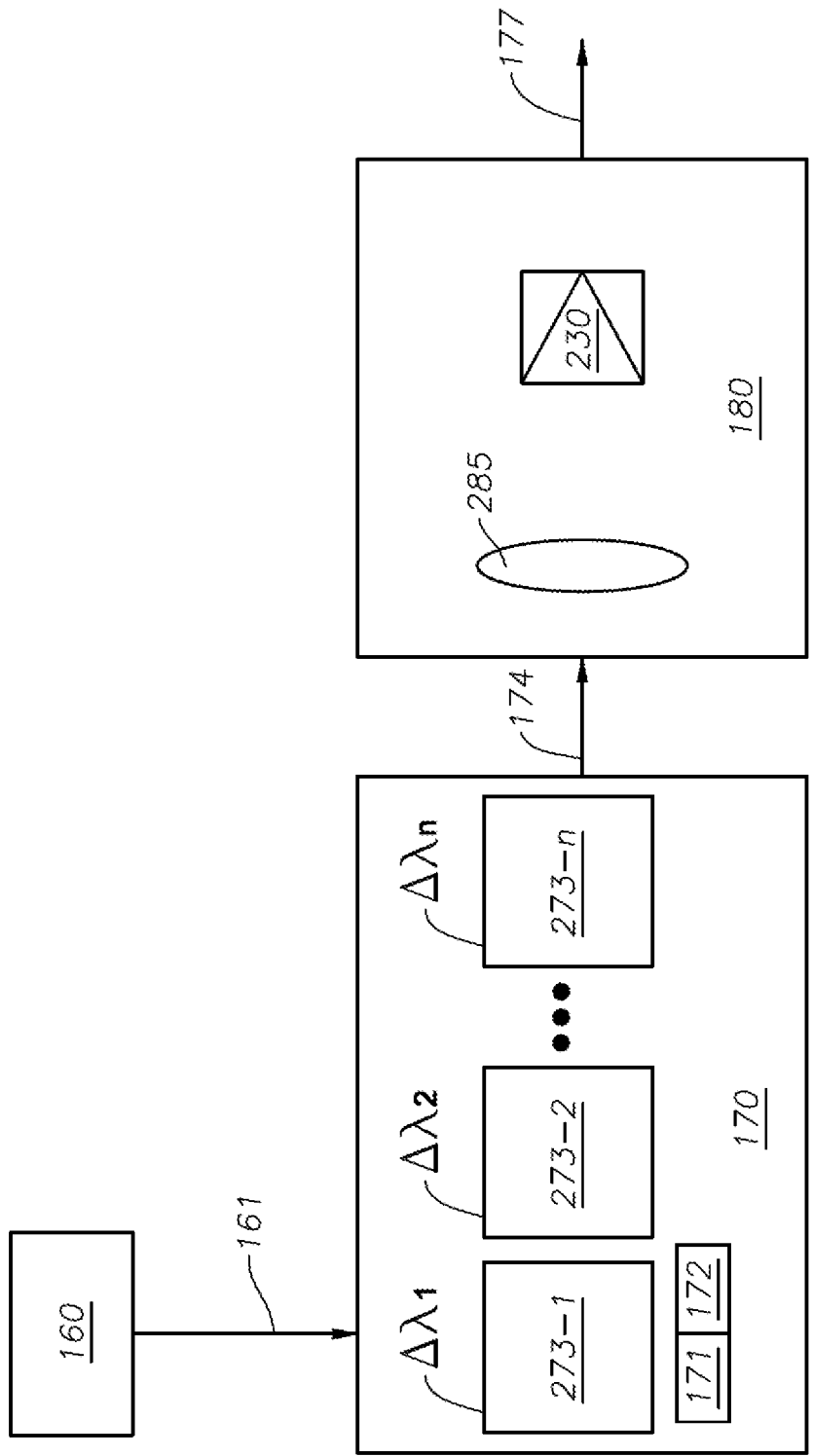
FIG. 2 shows a more detailed view of certain components in a system to perform an optical measurement of a sample, according to some embodiments.

FIG. 2 shows a more detailed view of dispersion block 160, intensity modulation block 170, and detector block 180 in system 100, according to some embodiments. Wavelength dispersion block 160 is as described in detail above (cf. FIG. 1). Wavelength dispersion block 160 provides dispersed sample light 161 to intensity modulation block 170, from sample light 151. Accordingly, dispersed sample light 161 is spatially separated into 'n' sample light portions, each including a spectral content denoted as $\Delta\lambda_1$, $\Delta\lambda_2$, . . . , and $\Delta\lambda_n$, where 'n' may have any positive integer value.

The intensity modulation block 170 of FIG. 2 shows a plurality of intensity modulation devices 273, each disposed to receive a portion 273 of the dispersed sample light 161: 273-1 ($\Delta\lambda_1$), 273-2 ($\Delta\lambda_2$), up to 273-n ($\Delta\lambda_n$). Intensity modulation devices 273 provide variable intensity attenuation to sample light portions $\Delta\lambda_1$, $\Delta\lambda_2$, . . . , and $\Delta\lambda_n$. Thus, modulation block 170 forms a modulated sample light 174 which is collected by detector block 180.

In some embodiments, dispersion block 160 may separate sample light 151 temporally. Thus, the 'n' sample light portions including a spectral content $\Delta\lambda_1$, $\Delta\lambda_2$, and $\Delta\lambda_n$ may be arranged in separate and subsequent time intervals forming a stream of modulated, dispersed sample light 174. For example, dispersion block 160 may include an elongated dispersive optical medium, such as a waveguide or optical fiber. In such a configuration, different wavelength components $\Delta\lambda_1$, $\Delta\lambda_2$, . . . , and $\Delta\lambda_n$ are dispersed in time while traversing the optical medium. In such a configuration, intensity modulation device 273 may function as an optical attenuator changing an attenuation value in time, each attenuation value corresponding to a different light portion.

Detector block 180 in FIG. 2 includes collection optics 285 and a detector 230. In some embodiments, detector 230 is a photodetector and may include a single photo-sensitive element. In such a configuration, collection optics 285 focuses at least a portion of modulated, dispersed sample light 174 from intensity modulation element 170 onto photodetector 230. Further according to some embodiments, photodetector 230 may include multiple photo-sensitive elements, such as two, four (quadrant) or more photo-sensitive elements, such that collection optics 285 may focus a first portion of modulated, dispersed sample light 174 onto a first photo-sensitive element, and a second portion of modulated, dispersed sample light 174 onto a second photo-sensitive element. Alternatively, each portion of dispersed sample light 174 may be focused on a different portion of a single photo-sensitive element.

In some embodiments, collection optics 285 may include lenses, mirrors, and other elements such as optical fibers. Accordingly, collection optics 285 may include an imaging optical element forming an image of modulation block 170 onto the surface of detector 230. For example, the array of photo-sensitive elements in detector 230 may be a two-dimensional (2D) array of photo-sensitive elements. In that regard, detector 230 may include an array of photo-sensitive elements forming an image plane, or a portion of an image plane of collection optics 285.

The intensity modulation device 173 of intensity modulation block 170 is shown in more detail in FIGS. 3A and 3B as intensity modulation device 273 (273-1 and 273-n are shown, where 'n' is any positive integer). In some embodiments, each intensity modulation device 273 includes an array of modulation elements 375-1 through 375-k (hereinafter referred to collectively as modulation elements 375), where 'k' is an integer greater than or equal to 'n.' Modulation elements 375 may be movable mirrors forming a 2D-array, according to some embodiments. In that regard, as described above, intensity modulation block 170 may include an electronically controllable circuit, such as a micro-electromechanical system (MEMs). For example, intensity modulation block 170 may be or include a digital light processor (DLP).

In some embodiments intensity modulation is provided by adjusting the area of intensity modulation device 273 directing light in a desired direction. FIG. 3A illustrates pattern 370a with 75% of modulation elements 375 in a first or 'on' (clear) configuration and 25% of modulation elements 375 in a second or 'off' (shaded) configuration, where 'on' represents a modulation element 375 that directs or transmits light to a detector 230 and 'off' represents a modulation element 375 that directs or reflects light away from detector 230. FIG. 3B illustrates pattern 370b with 25% of modulation element 375 'on' (clear) and 75% of modulation elements 375 'off' (shaded). It will be appreciated, especially with reference to the discussion, that patterns 370a and 370b represent the reverse of one another, thereby representing the total spectrum of light collected for a sample at a particular wavelength $\lambda$. In any event, by virtue of the modulation elements 375 each being in at least a first or second configuration, a multiplicity of patterns may be formed by the intensity modulation device 273, which patterns are associated with various measurable properties of the sample.

In certain embodiments, intensity modulation block 170 can be switched very quickly (kHz) for the complete rewriting of the pattern, such as when intensity modulation block 170 comprises one or more DLP devices. In some embodiments more than 2 million addresses per second are available. Thus, for a 2D-array having approximately 1000 elements, about 2000 patterns per second may be provided by intensity modulation block 170, in some embodiments. The pattern writing can include a black pattern (all modulation elements 375 'shaded'), which serves the function of chopping. The use of mirrors rather than an absorption media for modulation elements 375 allows detection of fainter signals, and operation at lower concentrations of target analyte. A DLP device according to some embodiments may be a mirror set above a memory cell on a MEMs chip. A window allows light entrance and exit to intensity modulation block 170.

Accordingly, the 2D array of modulation elements 375 of block 170 has a 'wavelength' dispersion axis, $\lambda$ (abscissa of FIGS. 3A and 3B), and a 'Y' axis (ordinate of FIGS. 3A and 3B). Thus, intensity modulation devices 273 extend along the 'wavelength' axis, and are distinguished from each other by a center wavelength $\lambda$ and a bandwidth $\Delta\lambda$ of the light impinging on all modulation elements 375 included within each intensity modulation device. FIGS. 3A and 3B show each intensity modulation device 273 having the same or a similar number of modulation elements 375. One of ordinary skill will recognize that this configuration is not limiting, and in general the number of rows and columns of modulation elements 375 of an intensity modulation device 273 may vary. In some embodiments, the number of rows and columns of modulation elements 273-j is determined by the bandwidth $\Delta\lambda_j$ of dispersed light 161 centered at $\lambda_j$. The bandwidth $\Delta\lambda_j$ of dispersed light 161 centered at $\lambda_j$ is in turn determined by the spectral resolution (dispersive power) of dispersion block 160. In embodiments consistent with the present disclosure, the number of rows of elements 375 along the 'Y' axis or the number of columns along the $\lambda$ axis may be similar or the same for all intensity modulation devices 273.

FIGS. 3A and 3B illustrate some modulation elements 375 as 'clear' and some modulation elements 375 as 'shaded' within an intensity modulation device 273. For purposes of the description references to 'clear' and 'shaded' are simply intended to represent different reflective configurations of the modulation element 375. In some embodiments, a 'clear' element indicates a full reflection of the portion of dispersed sample light 161 impinging on the given modulation element toward detector block 180. And a 'shaded' element indicates 'zero' reflection of the portion of dispersed sample light 161 impinging on the given modulation element onto detector block 180. Accordingly, portions of light within an intensity modulation device 273 directed to modulation elements 375 having the same 'clear' or 'shaded' configuration follow substantially the same optical path. For example, in some embodiments the portion of light impinging on 'clear' elements 375 within an intensity modulation device 273 may be directed to detector 230 substantially simultaneously. In some embodiments the portion of light impinging on 'clear' elements 375 within an intensity modulation device 273 may be directed to a first portion of detector 230 substantially simultaneously. Likewise, the portion of light impinging on 'shaded' elements 375 within an intensity modulation device 273 may be directed to an optical 'dump,' to a second modulation block, or to a second portion of detector 230, substantially simultaneously.

Accordingly, modulation elements 375 may electronically switch from a 'clear' configuration to a 'shaded' configuration by an electrical signal. In embodiments where intensity modulation block 170 is a MEMs array, modulation element 375 may be a micro-mirror. Therefore, a 'clear' or 'shaded' configuration may be defined by an angular position of the micro-mirror. For example, in a 'clear' configuration dispersed light 161 is deflected by the micro-mirror and collection optics 285 into an optical path ending on the surface of detector 230, or in a first portion of detector 230. Likewise, in a 'shaded' configuration dispersed light 161 is deflected by the micro-mirror and collection optics 285 into an optical path ending in an optical 'dump', in a second modulation block, or in a second portion of detector 230.

FIG. 3A shows intensity modulation block 170 with modulation elements 375 in 'clear' and 'shaded' configurations forming pattern 370a. In some embodiments, pattern 370a may be changed by electronically adjusting the state of each of modulation elements 375. For example, in some embodiments a configuration complementary to pattern 370a may result from switching each of modulation elements 375 to the opposite state. Thus, a modulation element in 'clear' state in pattern 370a may be switched to a 'shaded' state. And a modulation element in 'shaded' state in pattern 370a may be switched to a 'clear' state. The resulting configuration is pattern 370b, as described below.

FIG. 3B shows intensity modulation block 170 with modulation elements 375 in 'clear' and 'shaded' pattern 370b. Accordingly, patterns 370a and 370b are complementary. In that regard, the sum of the light intensity from all modulation elements 375 in 'clear' state in pattern 370a and the light intensity from all modulation elements 375 in 'clear' state in pattern 370b is the total dispersed light 161. This will be described in detail in reference to FIG. 4, below.

Figure 4:
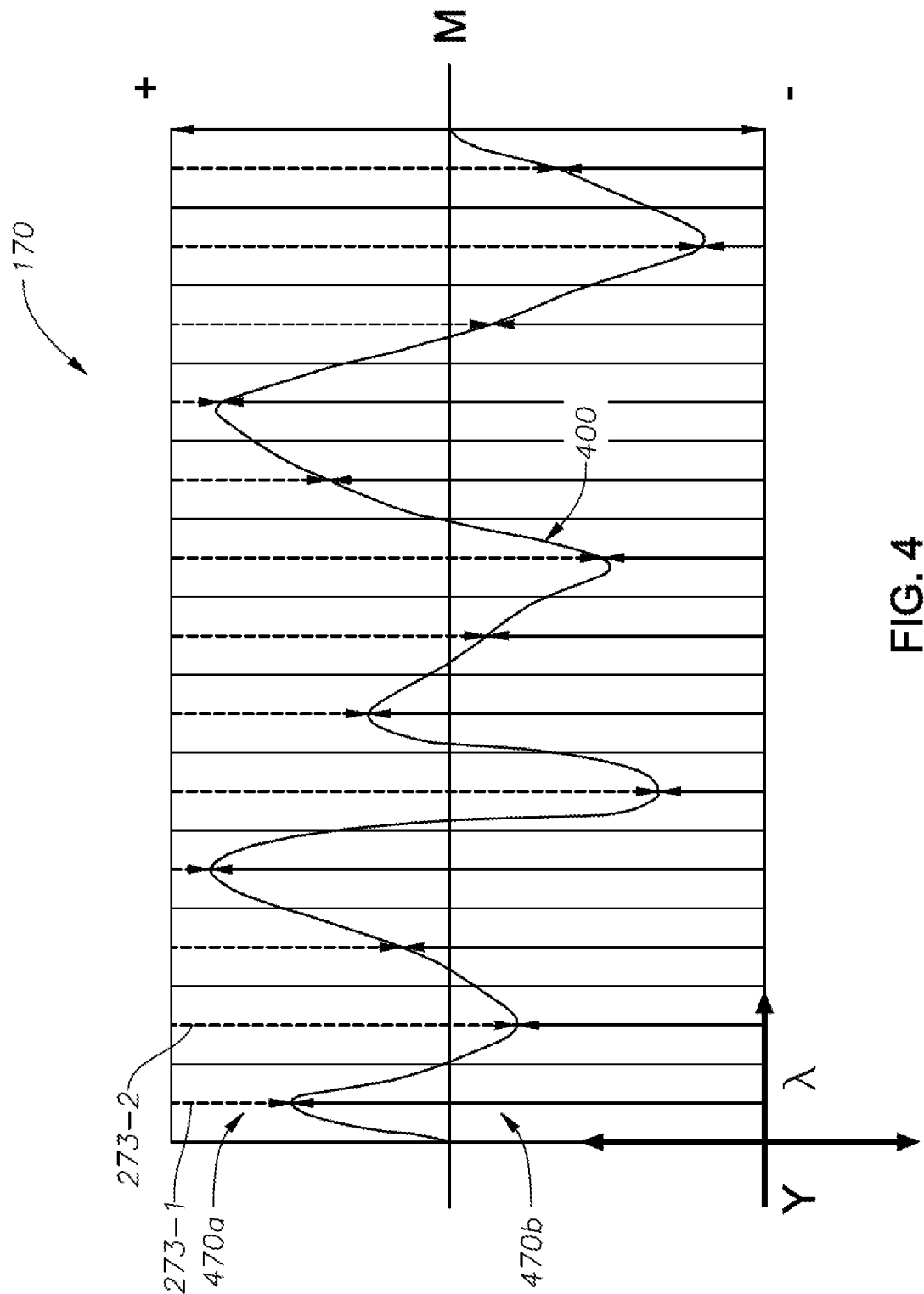
FIG. 4 shows a linear regression vector represented by the arrangement of components of an intensity modulation block in a system to perform an optical measurement of a sample, according to some embodiments.

FIG. 4 shows a linear regression vector 400 represented by the arrangement of modulation elements 375 of FIG. 3. The intensity of light from modulation elements in 'clear' state of pattern 370a is shown as grey arrows 470a forming a spectral trace $S_a(\lambda)$. The intensity of light from modulation elements in 'clear' state of pattern 370b is shown as black arrows 470b forming a spectral trace $S_b(\lambda)$. As shown in FIG. 4, the sum of the light intensity of curve 470a to the light intensity of curve 470b is a total intensity of dispersed light 161. In some embodiments, the sum of the light intensity of pattern 370a to the light intensity of pattern 370b may be independent of the selected shape of patterns 370a and 370b. Thus, if the spectrum of dispersed light 161 is $A(\lambda)$ (or A, in vector notation), in some embodiments:

$$A(\lambda) = S_a(\lambda) + S_b(\lambda) \tag{1}$$

Accordingly, patterns 370a and 370b are selected according to an integrated computational element (ICE) whose spectral trace is illustrated approximately by trace 400. Trace 400 may be representative of a linear regression vector, $L_i(\lambda)$, associated with a measureable property, $\kappa_i$, of sample 120.

According to some embodiments, a regression vector $L_i(\lambda)$ may be formed to satisfy the following relation $$\kappa_i = \beta \cdot \sum_\lambda A(\lambda) \cdot L_i(\lambda) + \gamma \tag{2}$$

Thus, Equation (2) is the solution for a linear multivariate problem targeting a measureable property $\kappa_i$, of sample 120, where β is a proportionality constant and γ is a calibration offset. Values of β and γ depend on design parameters of device 100 and not on sample 120. For example, in some embodiments $\kappa_i$ may be the concentration of an analyte of interest in sample 120. In some embodiments, $\kappa_i$ may be an octane rating in a gasoline sample, or a gas-oil ratio (GOR) in a crude oil sample. Crude oil is a liquid containing a mixture of hydrocarbons forming oil, and dissolved gases such as methane ($CH_4$), carbon dioxide, ($CO_2$), and others. Hydrocarbons of interest in embodiments consistent with the present disclosure may be any one of the group including a $C_1$ hydrocarbon molecule (e.g., methane), a $C_2$ hydrocarbon molecule (e.g., ethanol), a $C_3$ hydrocarbon molecule (e.g., propane), a $C_4$ hydrocarbon molecule, a $C_5$ hydrocarbon molecule, and a $C_6$ hydrocarbon molecule (e.g., a hexane). The dissolved gases will form a gaseous phase at atmospheric conditions. Thus, when crude oil is released into the atmosphere it contains two main phases, a liquid phase which is the commonly known 'oil,' and a gas phase containing natural gas, including methane and other gases. Accordingly, the GOR of a downhole crude oil sample may indicate the value and potential use of a prospective reservoir.

Eq. (2) shows a linear relation between the product $A \cdot L_i$ and measureable property $\kappa_i$. The 'dot' product of vectors A and $L_i$ includes a summation over the product of each wavelength component of vectors A and $L_i$ (cf. summation in Eq. (2)). One of ordinary skill will recognize that a more general functional relation including non-linear terms in the product $A \cdot L_i$ may be used, according to embodiments consistent with the present disclosure.

In some embodiments, the spectral trace ($S_a$) formed by arrows 470a and the spectral trace ($S_b$) formed by arrows 470b in FIG. 4 may be selected such that:

$$L_i(\lambda) = \mu_i \frac{Sa(\lambda) - Sb(\lambda)}{Sa(\lambda) + Sb(\lambda)} + \nu_i \tag{3}$$

Where $\mu_i$ and $\nu_i$ are constants independent of wavelength, suitably chosen to satisfy Eq. (2) for measureable property $\kappa_i$, of sample 120. For example, the values of constants $\mu_i$ and $\nu_i$ may be chosen such that value M (cf. FIG. 4) is equal to 0.

In some embodiments, the spectral trace ($S_a$) formed by arrows 470a and the spectral trace ($S_b$) formed by arrows 470b in FIG. 4 may be selected such that:

$$L_i(\lambda) = \frac{\delta_{ai} Sa(\lambda)}{\delta_{bi}(Sb(\lambda) + Sa(\lambda))}. \tag{4}$$

Where $\delta_{ai}$ and $\delta_{bi}$ are constants independent of wavelength, suitably chosen to satisfy Eq. (2) for measureable property $\kappa_i$, of sample 120. For example, the values of constants $\mu_i$ and $\nu_i$ may be chosen such that value M (cf. FIG. 4) is equal to ½.

Accordingly, photodetector 230 detects signal $$T_a = \Sigma_\lambda S_a(\lambda) \tag{5.1}$$

and signal $$T_b = \Sigma_\lambda S_b(\lambda). \tag{5.2}$$

In embodiments where regression vector $L_i(\lambda)$ is obtained from Eq. (3), the value of measurable property $\kappa_i$ may be obtained as $$\kappa_i = \beta \cdot \{\mu_i \cdot (T_a - T_b) + \nu_i \cdot (T_a + T_b)\} + \gamma \tag{6}$$

In embodiments where regression vector $L_i(\lambda)$ is obtained from Eq. (4), the value of measurable property $\kappa_i$ may be obtained as $$\kappa_i = \beta \cdot \frac{\delta ai}{\delta bi} \cdot T_a + \gamma. \tag{7}$$

Accordingly, in some embodiments, the use of Eq. (7) relaxes the need for measurement $T_b$. For example, in some embodiments the value of $T_b$ may be measured less frequently than the value of $T_a$. In some embodiments $T_b$ may be measured as a calibration step in order to fine tune or re-adjust the value of parameter $\delta_{bi}$ (cf. Eq. (4)).

Figure 5:
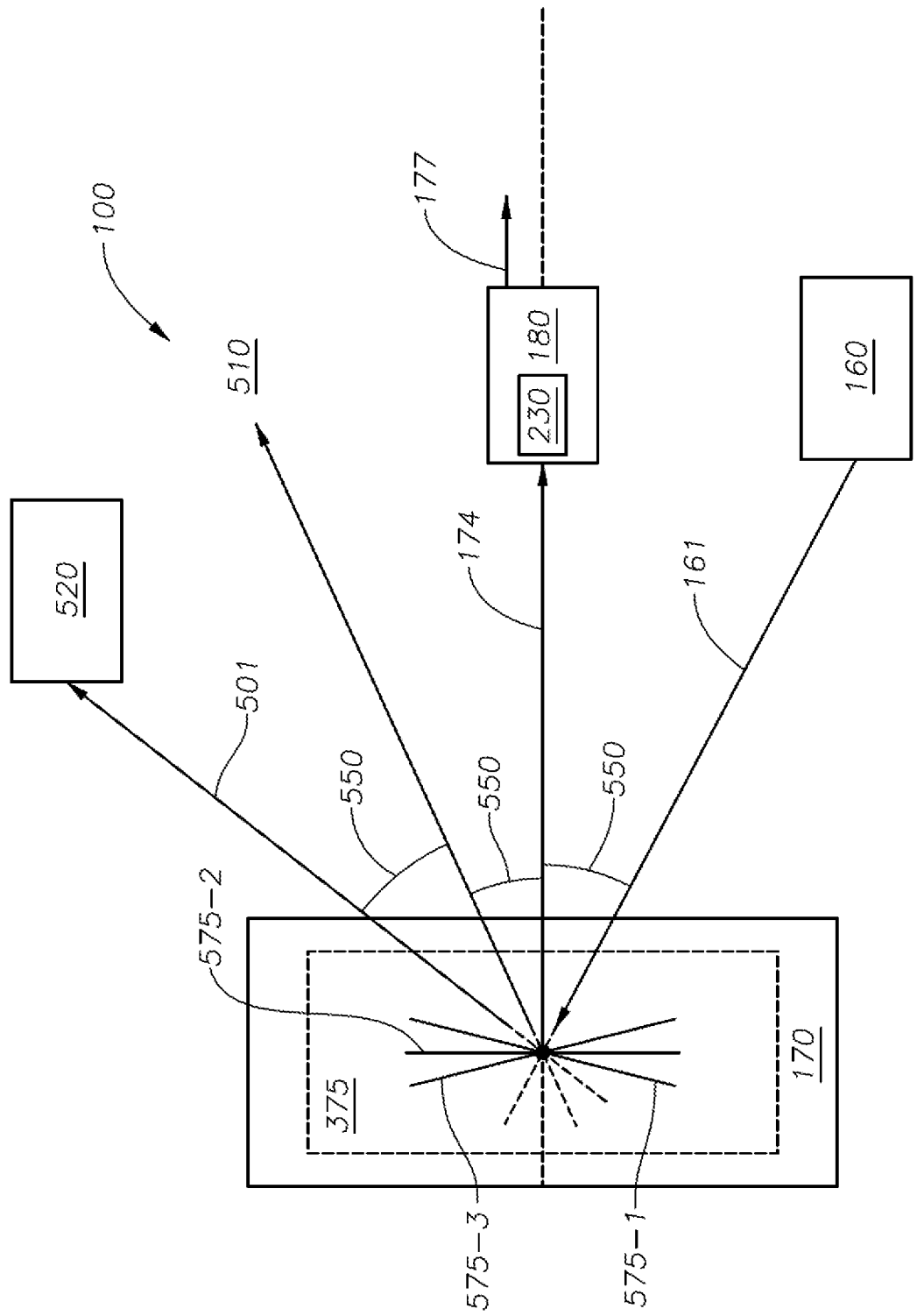
FIG. 5 shows a partial view of a system to perform an optical measurement of a sample, according to some embodiments.

FIG. 5 shows a partial view of a system 100 to perform an optical measurement of a sample, according to some embodiments. FIG. 5 illustrates modulation block 170 including modulation element 375. FIG. 5 also illustrates a flat state 510 and an 'off' state transferring a portion 501 of sample light 161 to an optical dump 520. Dispersion block 160 is as described in detail above (cf. FIG. 1). Detector block 180 is as described in detail above (cf. FIG. 1).

FIG. 5 illustrates modulation element 375 as a movable mirror (e.g., in a MEMs array) having three configurations 575-1, 575-2 and 575-3. The three configurations simply represent different positions of the movable mirror, such that a spectral wavelength λ may be reflected in a particular direction. For example, a spectral wavelength λ may be reflected to a detector block 180, or to another intensity modulation device 173/273 (see FIG. 1), or to an optical dump 520 or similar device. Recalling FIG. 3 as an example, a mirror may have a 'clear' configuration 575-1 in which a spectral wavelength λ is reflected to a detector block 180, and a 'shaded' configuration 575-3 in which a spectral wavelength λ is reflected away from detector block 180, such as toward an optical dump 520. In some embodiments, optical dump 520 may be a black cavity having absorbing walls or similar device disposed to limit ongoing transmission of the spectral wavelength λ. For example, light 501 entering optical dump 520 may be substantially absorbed thereby.

The operation of modulation element 375 may include a rotation through an angle 550 of the mirror for each configuration: 575-1, 575-2, and 575-3. Rotation angle 550 may vary according to the specific intensity modulation block 170 used. Accordingly, in some embodiments, rotation angle 550 may be approximately 24 degrees. Rotation angle 550 may be the same or different for various functions.

The 'clear' configuration 575-1 provides modulated and dispersed sample light 174 to detector block 180 as an "A channel". Wavelength dispersive element 160 provides dispersed sample light 161, which may be reflected by the modulation element 375 of an intensity modulation device 170 so that configuration 575-3 may function as a "B-channel." A B-channel may be the route to an optical dump 520 (as shown), or a second intensity modulation block 170 or a second intensity modulation device 273 or a second detector block 180, or a further signal processing in the optical system. Moreover, configuration 575-3 may be fully reflective of dispersed sample light 161 (yielding an unmodulated dispersed sample light) or configuration 575-3 may be partially reflective of dispersed sample light 161 (yielding dispersed sample light modulated differently than the modulated dispersed sample light of A-channel). Thus, in certain embodiments, an A-channel signal represents the modulated dispersed sample light while the B-channel signal represents the unmodulated dispersed sample light, which channels can be used for a variety of analytical purposes, such as, among other things, normalization. To the extent the B-channel signal is modulated, it may be used to measure another property of a sample under analysis.

In some embodiments, modulation elements 375 are switched from 'clear' configuration 575-1 to 'shaded' configuration 575-3 at a selected rate. Thus, a pulse-width modulated gray scale intensity may be generated to form curves 470a and 470b (cf. FIG. 4). In such embodiments, signals $T_a$ and $T_b$ may be selected on a pulse-width modulated collection scheme. Accordingly, all modulation elements 375 of an intensity modulation device 273 in intensity modulation block 170 may be on the same configuration state at any given time. Furthermore, modulation elements 375 may switch from 'clear' configuration 575-1 to 'shaded' configuration 575-3 at a rate having a selected duty cycle on 'clear' configuration 575-1, and a selected duty cycle on 'shaded' configuration 575-3. In some embodiments, detector 230 in detector block 180 provides a signal that is proportional to the duty cycle of 'clear' configuration 575-3. Accordingly, the duty cycle of 'clear' and 'shaded' configurations is adjusted for each of wavelength portions 273-$i$ in order to form curves 470a and 470b. In such embodiments, to form curve 470a a 'clear' duty cycle $t_1$ and a 'shaded' duty cycle $t_2$ is used. And to form curve 470b the reciprocal combination may be used: a 'clear' duty cycle $t_2$ and a 'shaded' duty cycle $t_1$ may be used. Thus, after a time collection period, τ, controller block 185 may form a signal $T_a$ and a signal $T_b$. Controller block 185 may use a synchronization scheme in processor circuit 186 such as to integrate the signal from detector 230 in the intervals corresponding to curve 470a into signal $T_a$, and to integrate the signal from detector 230 in the intervals corresponding to curve 470b into signal $T_b$.

Figure 6:
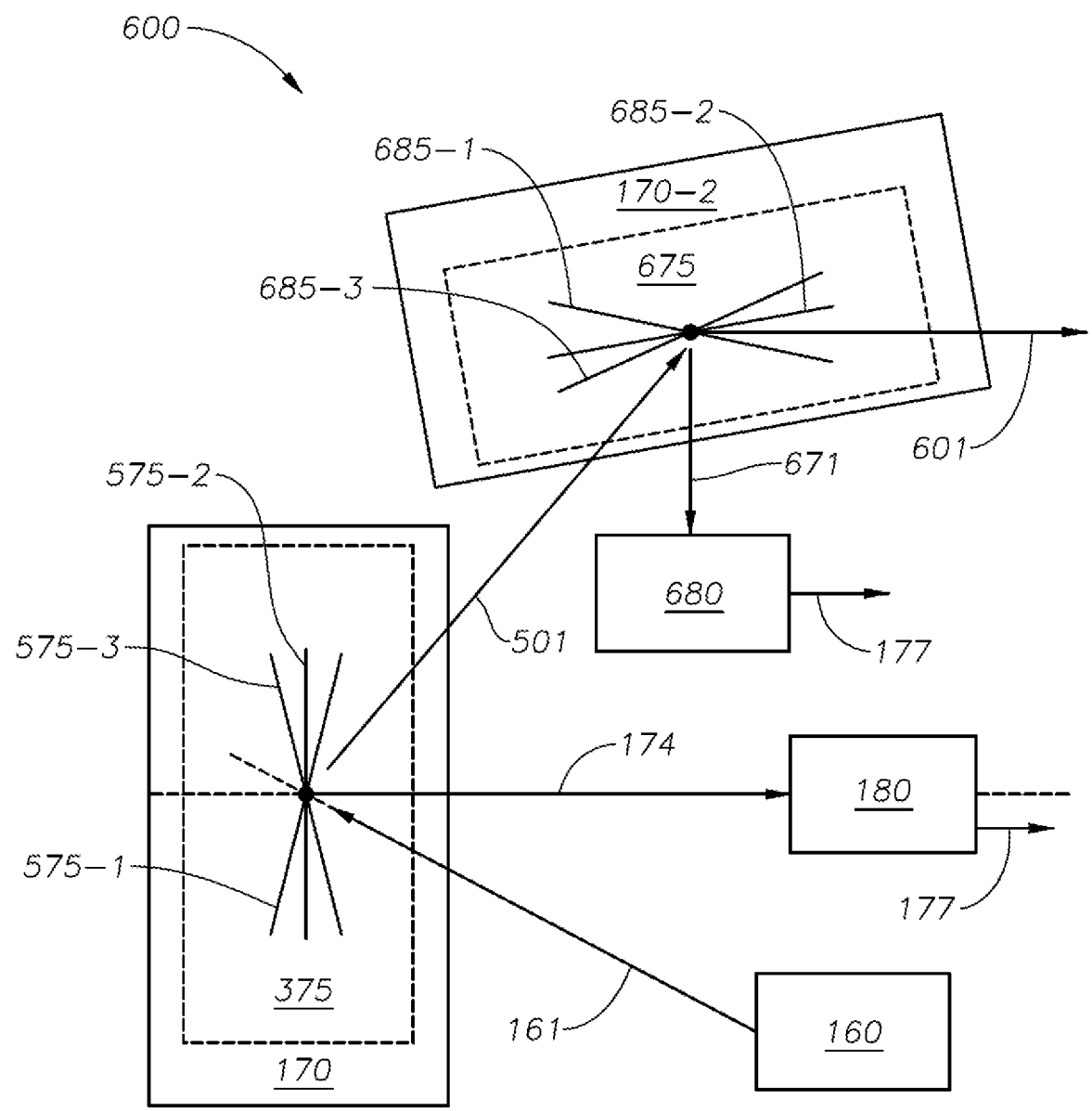
FIG. 6 shows a partial view of a system to perform an optical measurement of a sample, according to some embodiments.

FIG. 6 shows a partial view of a system 600 to perform an optical measurement of a sample, according to some embodiments. System 600 includes a second intensity modulation block 170-2 disposed in tandem with intensity modulation block 170. Intensity modulation blocks 170 and 170-2 may operate in an analogous manner. Thus, intensity modulation block 170 includes modulation element 375 and intensity modulation block 170-2 includes modulation element 675. In certain embodiments, modulation element 675 may be a movable mirror (e.g., in a MEMs array) having three configurations: 685-1, 685-2, and 685-3, similar to modulation element 375. In a first configuration 575-1, modulation element 375 transmits a light 161 to detector block 180 as light 174. In a second configuration 575-3, modulation element 375 reflects a light 161 to intensity modulation block 170-2 as light 501.

In embodiments as disclosed herein, intensity modulation block 170-2 may receive light 501 from intensity modulation block 170 when modulation element 375 is in a particular configuration, such as a 'second or reflecting configuration 575-3. Thus, in some embodiments, light 501 is not absorbed into an optical dump (e.g., optical dump 520 shown in FIG. 5) but reflected to a second intensity modulation block 170-2. Intensity modulation block 170-2 may direct light 671 into a detector block 680 when modulation element 675 is in a first configuration 685-1. Detector block 680 may be similar to detector block 180, described in detail above in relation to FIGS. 1 and 2. Thus, detector block 680 may include collection optics and a detector (e.g., collection optics 285 and detector 230, cf. FIG. 2). When modulation element 675 is in second or third configuration 685-2 or 685-3, light 601 may be directed away from detector block 680. In some embodiments, light 601 may be directed to an optical dump (e.g., optical dump 520, cf. FIG. 5), or it may be directed to a third intensity modulation block analogous to intensity modulation blocks 170 and 170-2. Thus, multiple intensity modulation blocks may be cascadingly arranged in series so that light is reflected from one to another, permitting multiple analyses to be performed from the single dispersed light.

In some embodiments, detector block 680 may be the same as detector block 180. Thus, system 600 may be optically configured to use a single detector block 180 in conjunction with intensity modulation blocks 170, 170-2. For example, detector 230 in detector block 180 may include a split photodetector, a quadrant detector, or a detector having multiple photo-sensitive elements. In such embodiments, the optical configuration of a system 600 may include a number of photo-sensitive elements in a first portion of detector 230 receiving light 174 from intensity modulator block 170, and a number of photo-sensitive elements in a second portion of detector 230 receiving light 671 from intensity modulator block 170-2.

FIG. 6 shows an optical configuration wherein modulation element 375 is in 'shaded' configuration 575-3 while modulation element 675 is in 'clear' configuration 685-1. Thus, in some embodiments when detector 180 measures a signal $T_a$, detector 680 measures a signal $T_b$ (cf. Eqs. 5.1 and 5.2). One of ordinary skill in the art may recognize that different optical configurations may be used for arranging intensity modulation blocks 170 and 170-2 in tandem, as illustrated in system 600.

For example, in some embodiments light 501 may be diffracted from intensity modulation block 170 along the 'Y' axis (cf. FIG. 3). In that regard, the diffraction of light 501 from modulation block 170 to modulation block 170-2 may be induced by a specific configuration of modulation elements 375 in block 170. For example, configuration 370a may be such that light impinging on the 2D array formed by modulation elements 375 is diffracted in the direction of light 501. Dispersed light 161 is already separated in wavelength portions 273-i ($\Delta\lambda_i$), with T an integer between 1 and 'n' (cf. FIG. 2). Pattern 370a may be such that portion 273-1 ($\Delta\lambda_1$) diffracts light at wavelength $\lambda_i$ in a similar direction as portion 273-j ($\Delta\lambda_1$) diffracts light at wavelength $\lambda_j$, with T an integer between 1 and 'n.' Thus, substantially all light in pattern 370b may be directed to modulation block 170-2. Embodiments using a diffraction approach as described above may include elements 375 having a dimension smaller than the wavelength of dispersed light 161. For example, elements 375 in portion 273-1 ($\Delta\lambda_1$) may have a dimension smaller than $\lambda_1$. Likewise, elements 375 in portion 273-j ($\Delta\lambda_1$) may have a dimension smaller than $\lambda_1$.

Thus, the choice of pattern 370a and complementary pattern 370b enables the measurement of a measurable property in sample 120. Accordingly, a single device such as an intensity modulator block controlled electronically by software stored in memory circuit 172 may be readily used to upgrade, modify or update system 100 to accommodate additional or altered measurable characteristics. For example, a new measurable property, $\kappa_i$, may be introduced by uploading a new pattern 370a into memory circuit 172. For example, a new measurable property $\kappa_i$ may be a new component in sample 120. The new component may be simply included by uploading a frame forming a pattern 370a (cf. FIGS. 3A and 3B) into memory circuit 172. Or an entirely new sample 120 may be analyzed for new measurable properties simply by uploading a new 'library' of patterns 370a in memory circuit 172.

In some embodiments each of intensity modulation blocks 170 and 170-2 may operate at a different wavelength region. For example, intensity modulation block 170 may operate in the UV or VIS spectral region and intensity modulation block 170-2 may operate in the NIR or the MIR spectral region. In that regard, detector 230 in detector block 180 may be suitable to measure signals $T_a$ and $T_b$ in the VIS spectral region. And detector block 680 may include a detector suitable to measure signals $T_a$ and $T_b$ in the NIR or the MIR spectral region. Moreover, while FIG. 6 illustrates blocks 170 and 170-2 in series, blocks 170 and 170-2 may be arranged in parallel, each receiving a portion of light 161 and operating on a different part of the spectral region simultaneously.

Figure 7:
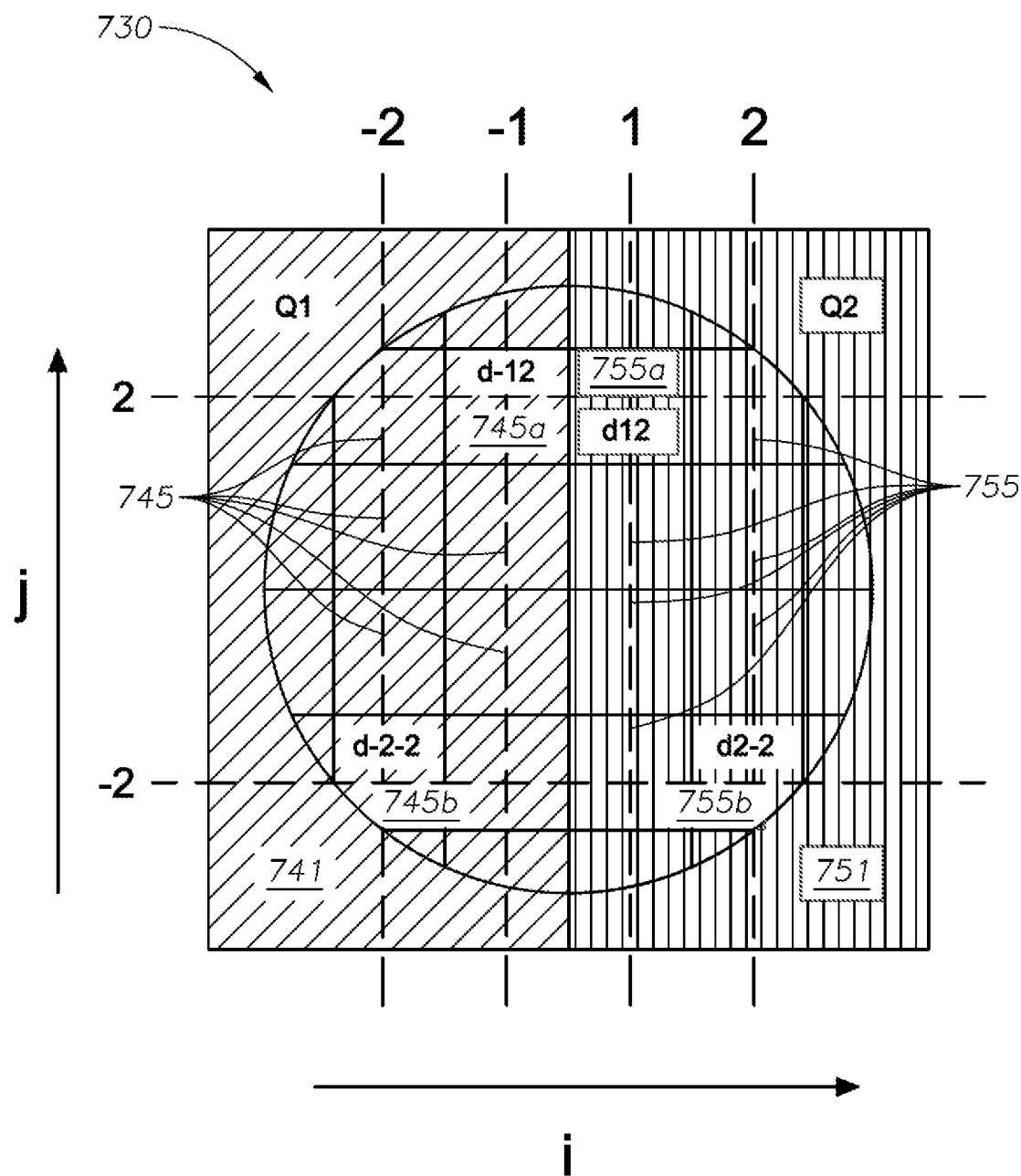
FIG. 7 shows a photodetector in a system to perform an optical measurement of a sample, according to some embodiments.

FIG. 7 shows a detector 730 in a system to perform an optical measurement of a sample, according to some embodiments. Detector 730 may include a plurality of photo-sensitive elements in a 2D array. For example, in some embodiments detector 730 may be a quadrant detector having four photo-sensitive elements arranged in a 2×2 square matrix. One of ordinary skill in the art will recognize that the particular shape and arrangement of photosensitive elements $d_{ij}$ is not limiting. In some embodiments, elements $d_{ij}$ may be arranged in a square grid, where T and T are integer numbers denoting a column (i) and a row (j), occupied by element $d_{ij}$. For example, FIG. 7 shows integer 'i' having values −2, −1, 1, and 2. FIG. 7 also shows integer 'j' having values −2 and 2. Further according to some embodiments, detector 730 may be separated into sectors 741 ($Q_1$) and 751 ($Q_2$). Elements in sector 741 are collectively denoted with reference numeral 745. Elements in sector 751 are collectively denoted with reference numeral 755. Accordingly, each one of elements $d_{ij}$ in detector 730 may be independently addressed by a controller (e.g., controller block 185 cf. FIG. 1).

Accordingly, detector measurements $T_a$ and $T_b$ (cf. Eqs. 5.1 and 5.2) may be obtained by two photosensitive elements 745a and 755a selected from photosensitive elements 745 and 755. A photosensitive element 745a performing measurement $T_a$ may be on a first side or a first portion of a split detector (e.g., sector $Q_1$). And a photosensitive element 755a performing measurement $T_b$ may be on a second side or a second portion of the split detector (e.g., sector $Q_2$). Accordingly, photo-sensitive elements 745a and 755a may be in symmetrical portions of detector 730. Thus, geometric factors such as optical aberrations may be cancelled out when a difference or a ratio of signals from photosensitive elements 745a and 755a is obtained.

Furthermore, each of detector measurements $T_a$ and $T_b$ may include addition of signals from a plurality of photosensitive elements $d_{ij}$. Thus, for example, measurement $T_a$ may include an addition of signals from photosensitive elements 745a and 745b, in sector $Q_1$, while measurement $T_b$ may include an addition of signals from photosensitive elements 755a and 755b, within sector $Q_2$. The addition may include a combinatorial combination of photosensitive elements $d_{ij}$ in a first portion (sector $Q_1$) and a second portion (sector $Q_2$) of detector 730.

A photodetector as described having multiple photosensitive elements is desirable in certain configurations because the photodetector can be simultaneously utilized for different patterns rather than sequentially measuring a first pattern with a first photodetector and second pattern with a second photodetector. As such, in certain embodiments, in will be appreciated that a detector 180 and a detector 730 may be used to process a plurality of patterns from one or more DLPs simultaneously rather than sequentially.

Figure 8:
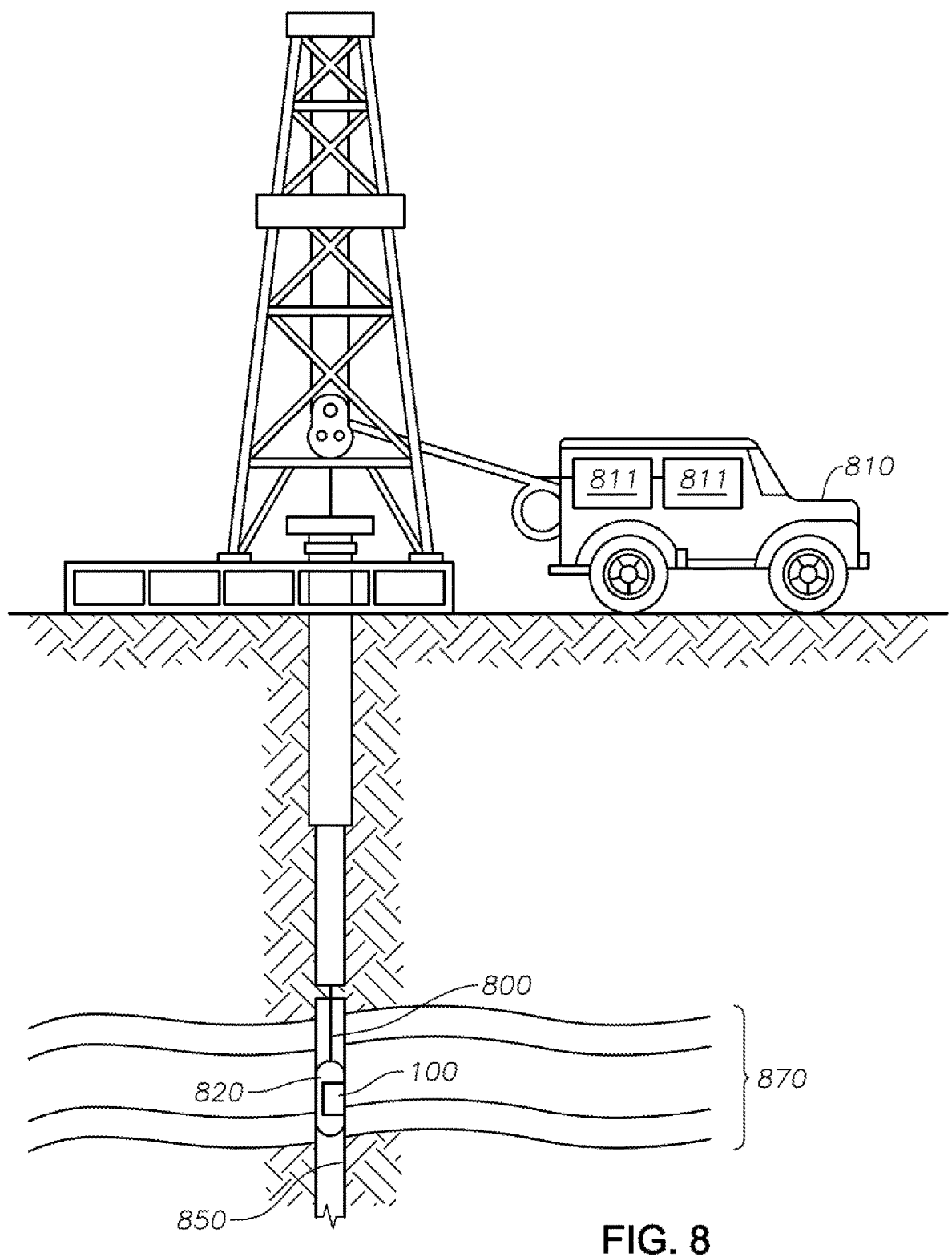
FIG. 8 shows a system to perform an optical measurement of a sample in a wireline logging application, according to some embodiments.

FIG. 8 shows a system to perform an optical measurement of a sample in a wireline logging application, according to some embodiments. Wireline logging includes measurements of fluids and substrates in wellbores drilled for oil and hydrocarbon exploration. In some embodiments, a surface unit 810 includes a processor circuit 811 and a memory circuit 812 to provide commands for sensor package 820 to perform measurements and store data obtained from the measurements. In certain embodiments, the surface unit may be a movable surface unit 810, such as a vehicle. Accordingly, once a wellbore 850 has been drilled, wireline measurements may be performed by introducing sensor package 820 into wellbore 850, using a wireline 800. Wellbore 850 may traverse through a ground formation 870. Sensor package 820 may have one or more components of an optical measurement system 100, including an intensity modulation block 170 and a detector block 180 as disclosed in various embodiments herein. Furthermore, sensor package 820 may include a portion of an optical delivery system to deliver input light 150 and a portion of an optical collection system to collect sample light 151 (cf. FIG. 1). In some embodiments, a portion of the light delivery system, light source 110, and a controller circuit may be included in surface unit 810. Likewise, a portion of the optical collection system may be included in surface unit 810, such as detection unit 180, and analysis unit 190. In some embodiments, the optical delivery system and the optical collection system may include an optical fiber, or fiber bundle. The optical fiber or fiber bundle carries input light 150 and sample light 151 along wireline 800.

Figure 9:
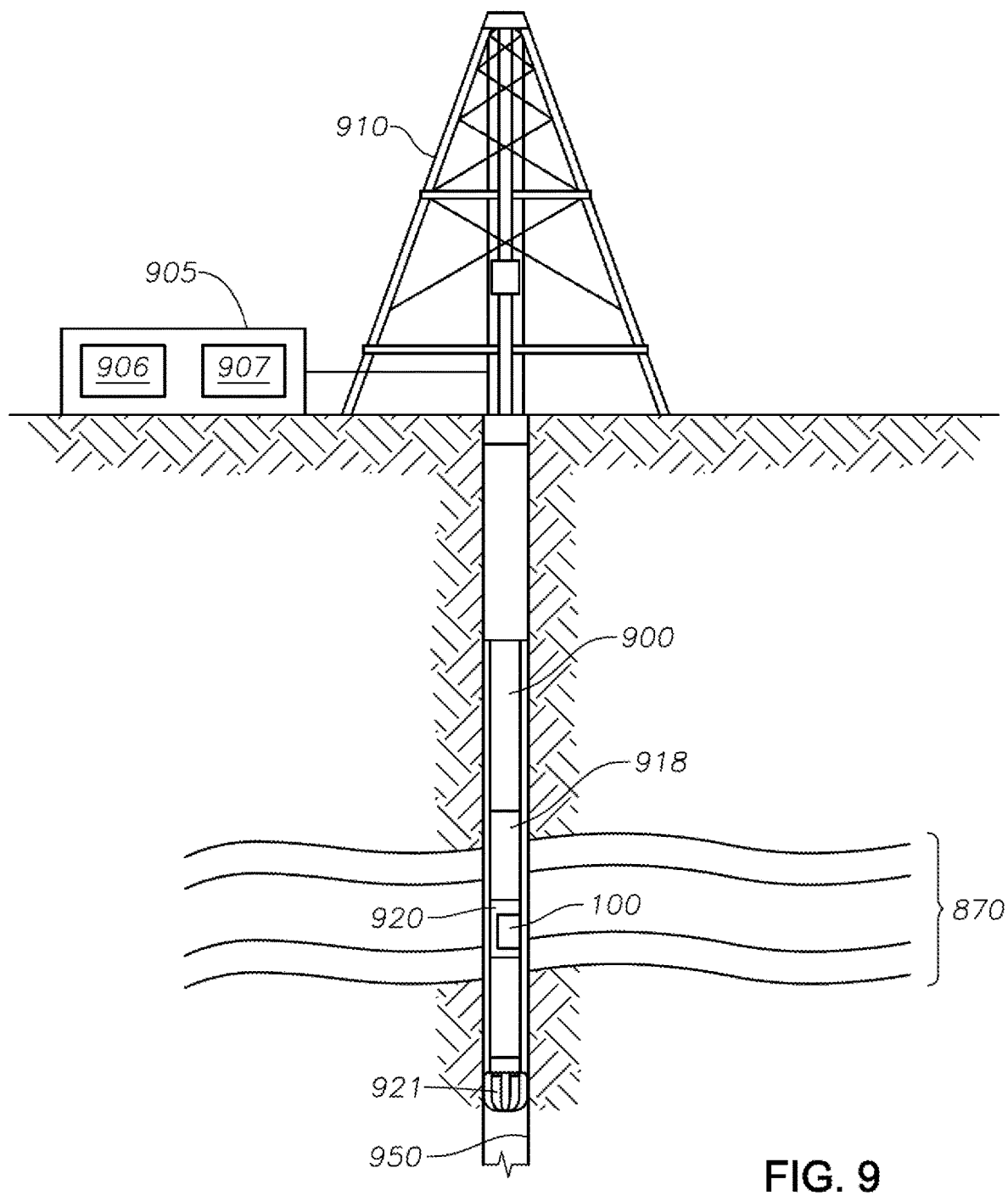
FIG. 9 shows a drill bore including a sensor in a system to perform an optical measurement in a sample for a logging-while-drilling (LWD) application, according to some embodiments.

FIG. 9 illustrates the deployment of an optical measurement system 100 during wellbore drilling operations, permitting logging-while-drilling (LWD) application of system 100, according to some embodiments. An LWD configuration performs desired measurements, such as acoustic, electromagnetic and optical data while a wellbore is being drilled. According to FIG. 9, a drill string 900 carries a bottom hole assembly 918 which includes a drill bit 921 utilized to drill a wellbore 950, traversing through ground formation 870. Drilling operations may be operated by a controller 905. A drilling rig 910 provides structural support to drill string 900. Controller 905 may include a processor circuit 906 and a memory circuit 907. Memory circuit 907 stores commands and data used by processor circuit 906 to control the drilling operations, such as controlling one or more functions of bottom hole assembly 918. Bottom hole assembly 918 includes a sensor package 920. Sensor package 920 includes one or more components of an optical measurement system 100 as described in various embodiments herein, for measuring characteristics of fluids in wellbore 950, which fluids may include drilling fluids, such as drilling mud, as well as formation fluids.

With respect to both FIGS. 8 and 9, it will be appreciated that transmission of sample light, dispersed light and modulated light may be accomplished in a number of ways known in the art, including, but not limited to transmission using an optical fiber or optical fiber bundle. As such, the components of system 100 may be physically adjacent one another or physically separated from one another. For example, the source for providing the illumination or sample light may be deployed adjacent the surface and the light is transmitted downhole utilizing an optical fiber.

Figure 10:
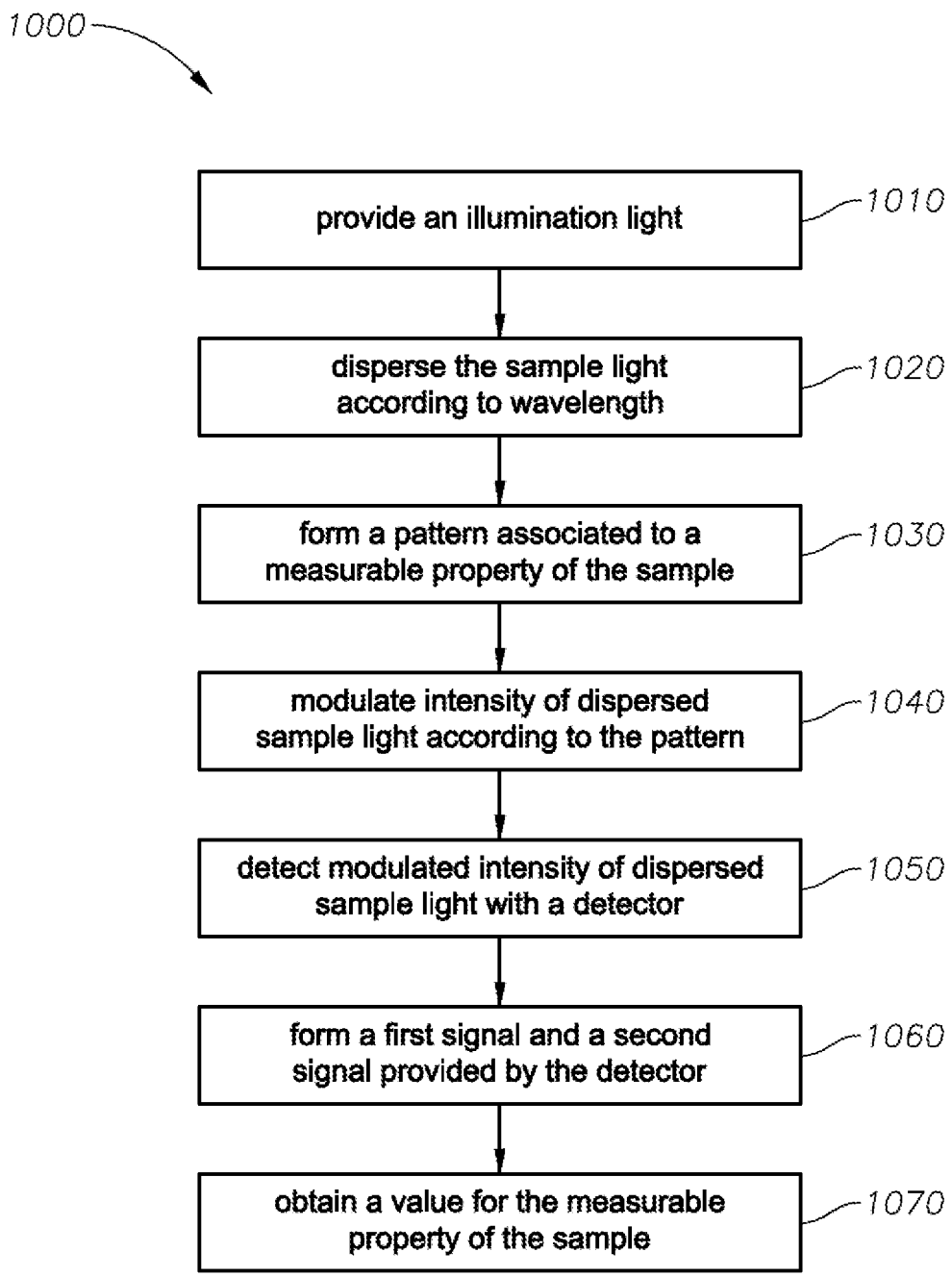
FIG. 10 is a flowchart illustrating steps in a method for measuring sample properties according to some embodiments.

FIG. 10 is a flowchart illustrating steps in a method 1000 for measuring sample properties according to some embodiments. Method 1000 may be performed using a system to perform an optical measurement of a sample, such as system 100 described in detail above (cf. FIG. 1). In that regard, steps in method 1000 may be partially or completely performed by a user handling optical system 100. Also, steps in method 1000 may be partially or completely performed by a processor circuit executing commands stored in a memory circuit. The processor circuit and the memory circuit may be included in an intensity modulation block (e.g., processor circuit 171, memory circuit 172, and intensity modulation device 173, cf. FIG. 1). The processor circuit and the memory circuit may also be included in a controller block (e.g., processor circuit 186, memory circuit 187, and controller block 185, cf. FIG. 1). The processor circuit and the memory circuit may be included in an analysis unit (e.g., processor circuit 191, memory circuit 192, and analysis unit 190, cf. FIG. 1).

Step 1010 includes providing an illumination light to a sample to form a sample light. The illumination light may be transmitted through the sample or reflected from the sample. Step 1020 includes dispersing the sample light according to wavelength. Step 1030 includes forming a pattern associated with a measurable property of the sample. In some embodiments, step 1030 includes performing a linear regression analysis of the sample for the measurable property. For example, in some embodiments step 1030 includes finding a linear regression vector such as vector $L_i(\lambda)$, described in detail above (cf. Eq. 2). In some embodiments, step 1030 includes forming a first pattern and a second pattern, such that for a given wavelength a sum of a first intensity of light in the first pattern and a second intensity of light in the second pattern is the total intensity of the sample light in the given wavelength. Furthermore, in some embodiments the first pattern includes a first signal from the first intensity of light and the second pattern includes a second signal from the second intensity of light.

Step 1040 includes modulating the intensity of the dispersed sample light according to the pattern. In some embodiments, step 1040 includes controlling a two-dimensional (2D) array of modulating elements arranged so that a first dimension is a wavelength dispersion direction. In that regard, the 2D array of modulating elements comprises movable mirrors in a micro-electromechanical element system (MEMs) and controlling the 2D array of modulating elements comprises providing an electronic signal to each of the movable mirrors to adjust the configuration of each mirror. For example, providing an electronic signal to each of the movable mirrors may include providing a first signal to a first portion of the movable mirrors in the 2D array along a second dimension, and may also include providing a second signal to a second portion of the movable mirrors in the 2D array along the second dimension. Further according to some embodiments the first portion and the second portion of the movable mirrors are associated with a regression vector for the measurable property of the sample. In some embodiments providing a first signal in step 1040 may include directing the dispersed sample light to the detector; and providing the second signal may include directing the dispersed sample light away from the detector.

In some embodiments providing a first signal in step 1040 may include providing a pulse-width modulated signal having a first duty cycle; and providing a second signal may include providing a pulse-width modulated signal having a second duty cycle. Accordingly, the first portion of movable mirrors provided with the first signal in step 1040 may include all the mirrors along the second dimension of the 2D array. Likewise, the second portion of movable mirrors provided with the second signal in step 1040 may include all the mirrors along the second dimension of the 2D array.

Step 1050 includes detecting the modulated and dispersed sample light with a detector. Step 1060 includes forming a first signal and a second signal provided by the detector. In some embodiments, step 1060 may be partially performed by the controller block to form a first signal $T_a$ and a second signal $T_b$ as described in detail above (cf. Eqs. 5.1 and 5.2). Step 1070 includes obtaining, using a processor circuit, a value for the measurable property of the sample with the first signal and the second signal. In some embodiments, step 1070 may include the processor circuit in the analysis unit performing calculations including the operations described in detail above (cf. Eqs. 6 and 7). As such, the measurable property obtained from the first signal and second signal may be used to make a determination about the sample, such as the chemical composition of the sample.

Thus, optical system for the measurement of sample properties has been described. Embodiments of the optical system may generally be characterized as an illumination source to provide a sample light; a dispersive element to disperse the sample light into wavelength portions; an intensity modulation device comprising an array of modulation elements electronically controllable to provide a modulated sample light including a selected portion of the dispersed sample light; a signal detector; and collection optics to direct the modulated sample light to the detector. For any of the foregoing embodiments, the optical system may include any one of the following elements, alone or in combination with each other:

The modulation elements are electronically controllable to provide a complimentary modulated sample light including a second selected portion of the dispersed sample light.

In such case, the modulated and complimentary modulated sample lights may form complimentary light patterns.

A difference between a pattern and a complementary pattern may be a linear regression vector associated with a measurable property of the sample.

A ratio of a pattern to a sum of the pattern and a complementary pattern is a linear regression vector associated with a measurable property of a sample.

The optical system includes a processor circuit and a memory circuit, wherein at least one pattern is stored in the memory circuit.

An array of modulation elements comprises at least one integrated computational element selected to measure a measurable property of the sample.

The detector is a split detector and includes a first detector area; and a second detector area.

A first detector area may consist of one specific portion or combinatorial combination of quadrants in a quadrant detector and a second detector area is a different quadrant or combinatorial combination of quadrants in the quadrant detector.

A first detector area may consist of one specific portion or combinatorial combination of photosensitive elements in an array detector and a second detector area is a different element or combinatorial combination of photosensitive elements in an array detector.

At least two intensity modulation devices, wherein each intensity modulation device comprises a DLP mechanism.

Intensity modulation devices arranged in series.

Intensity modulation devices arranged in parallel.

Moreover, embodiments of a method for measuring sample properties may generally be characterized as providing an illumination light to a sample to yield a sample light; dispersing the sample light according to wavelength; forming a pattern associated with a measurable property of the sample; modulating the intensity of the dispersed sample light according to the pattern; detecting the modulated and dispersed sample light with a detector; forming a first signal and a second signal provided by the detector; and obtaining a value for the measurable property of the sample with the first signal and the second signal. For any of the foregoing embodiments, the method may include any one of the following steps, alone or in combination with each other:

Forming a pattern comprises performing a linear regression analysis of the sample for the measurable property.

Forming a pattern comprises forming a first pattern and a second pattern such that for a given wavelength, a sum of a first intensity of light in the first pattern and a second intensity of light in the second pattern is the total intensity of the sample light in the given wavelength.

A first pattern comprises the first signal and the second pattern comprises the second signal.

Modulating the intensity of the dispersed sample light comprises controlling a two-dimensional (2D) array of modulating elements arranged so that a first dimension is a wavelength dispersion direction, wherein the 2D array of modulating elements may comprise a plurality of movable mirrors in a micro-electromechanical element system (MEMs).

Where a 2D array of modulating elements comprises movable mirrors in a micro-electromechanical element system (MEMs), controlling the 2D array of modulating elements comprises providing an electronic signal to each of the movable mirrors. In such case, providing an electronic signal to each of the movable mirrors may comprise providing a first signal to a first portion of the movable mirrors in the 2D array along a second dimension; and providing a second signal to a second portion of the movable mirrors in the 2D array along the second dimension.

A first portion and a second portion of movable mirrors are associated with a regression vector for the measurable property of the sample.

Providing a first signal comprises directing the dispersed sample light to the detector; and providing a second signal comprises directing the dispersed sample light away from the detector.

Providing a first signal comprises providing a pulse-width modulated signal having a first duty cycle; and providing a second signal comprises providing a pulse-width modulated signal having a second duty cycle.

A first portion of movable mirrors comprises all the mirrors along a second dimension of a 2D array.

A sample is disposed within a wellbore and comprises a fluid disposed in the wellbore.

Furthermore, embodiments of a system for measurement of a sample property during hydrocarbon recovery operations may generally be characterized as having a structure deployed in a wellbore; an illumination source to provide a sample light; a dispersive element to disperse the sample light into wavelength portions; an intensity modulation device comprising an array of modulation elements electronically controllable to provide a modulated sample light including a selected portion of the dispersed sample light; a signal detector; and collection optics to direct the modulated sample light to the detector, wherein one or more of the dispersive element, intensity modulation device, signal detector and collection optics are carried in the wellbore by the structure. For any of the foregoing embodiments, the system may include any one of the following elements, alone or in combination with each other:

A structure is selected from the group consisting of a wireline, a slickline, coiled tubing or a drill string.

The modulation elements are electronically controllable to provide a complimentary modulated sample light including a second selected portion of the dispersed sample light. In such case, the modulated and complimentary modulated sample lights may form complimentary light patterns.

A difference between a pattern and a complementary pattern may be a linear regression vector associated with a measurable property of the sample.

A ratio of a pattern to a sum of the pattern and a complementary pattern is a linear regression vector associated with a measurable property of a sample.

The optical system includes a processor circuit and a memory circuit, wherein at least one pattern is stored in the memory circuit.

An array of modulation elements comprises at least one integrated computational element selected to measure a measurable property of the sample.

The detector is a split detector and includes a first detector area; and a second detector area.

A first detector area may consist of one specific portion or combinatorial combination of quadrants in a quadrant detector and a second detector area is a different quadrant or combinatorial combination of quadrants in the quadrant detector.

A first detector area may consist of one specific portion or combinatorial combination of photosensitive elements in an array detector and a second detector area is a different element or combinatorial combination of photosensitive elements in an array detector.

At least two intensity modulation devices, wherein each intensity modulation device comprises a DLP mechanism.

Intensity modulation devices arranged in series.

Intensity modulation devices arranged in parallel.

Embodiments described herein are exemplary only. One skilled in the art may recognize various alternative embodiments from those specifically disclosed. Those alternative embodiments are also intended to be within the scope of this disclosure.

What is claimed is:

1. An optical system for the measurement of properties of a fluid sample from a wellbore in an earthen formation, the optical system comprising:
    a sensor package positioned in the wellbore, the sensor package containing a sample containment area to receive the fluid sample;
    an illumination source to direct an illumination light at the fluid sample and to provide a sample light in response to illumination of the fluid sample by the illumination light;
    a dispersive element to disperse the sample light into wavelength portions;
    an intensity modulation device comprising an array of modulation elements electronically controllable to provide a modulated sample light including a selected portion of the dispersed sample light;
    a signal detector; and
    collection optics to direct the modulated sample light to the detector,
    wherein the array of modulation elements comprises at least one integrated computational element selected to measure a measurable property of the sample.

2. The optical system of claim 1 wherein the modulation elements are electronically controllable to provide a complementary modulated sample light including a second selected portion of the dispersed sample light.

3. The optical system of claim 2 wherein a difference between a sample light pattern and a complementary sample light pattern is a linear regression vector associated with a measurable property of the sample.

4. The optical system of claim 2 wherein a ratio of a sample light pattern to a sum of the pattern and a complementary sample light pattern is a linear regression vector associated with a measurable property of the sample.

5. The optical system of claim 1 further comprising a processor circuit and a memory circuit, wherein at least one pattern is stored in the memory circuit.

6. The system of claim 1 wherein the signal detector is a split detector and comprises:
    a first detector area; and
    a second detector area.

7. The system of claim 6 wherein the first detector area is one specific portion or combinatorial combination of quadrants in a quadrant detector, and the second detector area is a different quadrant or combinatorial combination of quadrants in the quadrant detector.

8. The system of claim 6 wherein the first detector area is one specific portion or combinatorial combination of photosensitive elements in an array detector, and the second detector area is a different element or combinatorial combination of photosensitive elements in an array detector.

9. The method of claim 1, wherein the sample is disposed within a wellbore and comprises a fluid disposed in the wellbore.

10. A method for measuring properties of a fluid sample received from a wellbore in an earthen formation, the method comprising:
    receiving the fluid sample into a containment area of a sensor package positioned in the wellbore;
    providing an illumination light to the fluid sample to yield a sample light in response to illumination of the fluid sample by the illumination light;
    dispersing the sample light according to wavelength;
    forming a pattern associated with a measurable property of the sample;
    modulating the intensity of the dispersed sample light according to the pattern;
    detecting the modulated and dispersed sample light with a detector;
    forming a first signal and a second signal provided by the detector; and
obtaining a value for the measurable property of the sample with the first signal and the second signal;
    wherein modulating the intensity of the dispersed sample light comprises controlling a two-dimensional (2D) array of modulating elements arranged so that a first dimension is a wavelength dispersion direction;
    wherein the 2D array of modulating elements comprises a plurality of movable mirrors in a micro-electromechanical element system (MEMs), and controlling the 2D array of modulating elements comprises providing an electronic signal to each of the movable mirrors;
    wherein providing an electronic signal to each of the movable mirrors comprises providing a first signal to a first portion of the movable mirrors in the 2D array along a second dimension, and providing a second signal to a second portion of the movable mirrors in the 2D array along the second dimension; and
    wherein the first portion and the second portion of the movable mirrors are associated with a regression vector for the measurable property of the sample.

11. The method of claim 10 wherein forming a pattern comprises performing a linear regression analysis of the sample for the measurable property.

12. The method of claim 10 wherein forming a pattern comprises forming a first pattern and a second pattern such that for a given wavelength, a sum of a first intensity of light in the first pattern and a second intensity of light in the second pattern is the total intensity of the sample light in the given wavelength.

13. The method of claim 12 wherein the first pattern comprises the first signal and the second pattern comprises the second signal.

14. The method of claim 10 wherein:
    providing the first signal comprises directing the dispersed sample light to the detector; and
    providing the second signal comprises directing the dispersed sample light away from the detector.

15. The method of claim 10 wherein:
    providing the first signal comprises providing a pulse-width modulated signal having a first duty cycle; and
    providing the second signal comprises providing a pulse-width modulated signal having a second duty cycle.

16. The method of claim 15 wherein the first portion of the movable mirrors comprises all the mirrors along the second dimension of the 2D array.

17. A system for measurement of a sample property during hydrocarbon recovery operations, the system comprising:
    a structure deployed in a wellbore,
    an illumination source to provide a sample light;
    a dispersive element to disperse the sample light into wavelength portions;

an intensity modulation device comprising an array of modulation elements electronically controllable to provide a modulated sample light including a selected portion of the dispersed sample light; a signal detector; and collection optics to direct the modulated sample light to the detector, wherein one or more of the dispersive element, intensity modulation device, signal detector and collection optics are carried in the wellbore by the structure, wherein the array of modulation elements comprises at least one integrated computational element selected to measure a measurable property of the sample.

18. The system of claim 17, wherein the structure is selected from the group consisting of a wireline, a slickline, coiled tubing or a drill string.

19. The system of claim 17, further comprising at least two intensity modulation devices, wherein each intensity modulation device comprises a DLP mechanism.

20. The system of claim 19, wherein the intensity modulation devices are arranged in series.

21. The system of claim 19, wherein the intensity modulation devices are arranged in parallel.

\* \* \* \* \*